UNITED STATES PATENT OFFICE 2,362,137

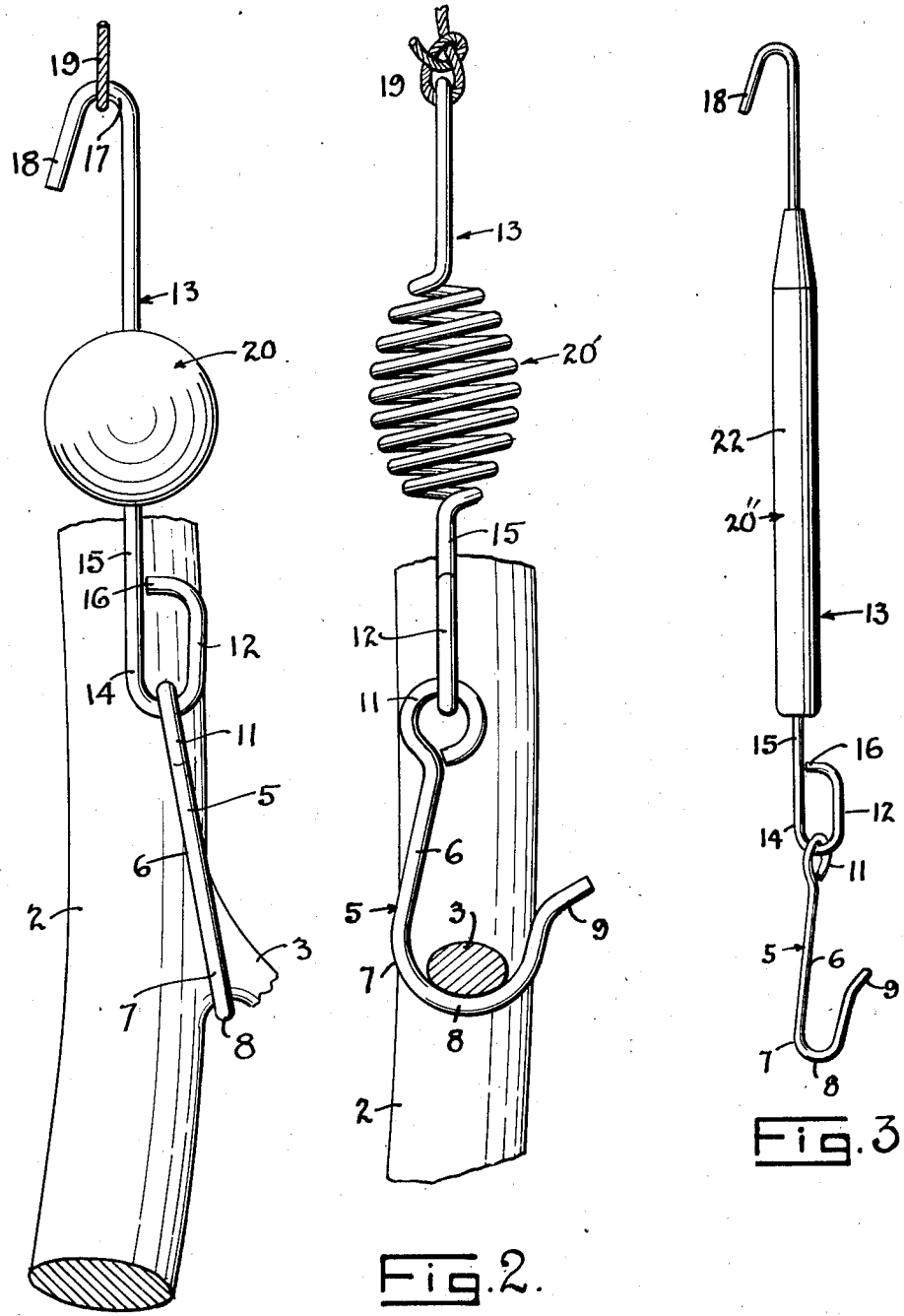

BANANA HOOK

Morris Kagan, Houston, Tex.

Application November 15, 1943, Serial No. 510,351

3 Claims. (Cl. 248—317)

The invention relates to a support hook particularly adapted for supporting bunches of bananas.

It has been the practice to support bunches of bananas with a suitable string or small rope, which is attached to the bunch when they are unloaded, and usually stays with the stem when it is discarded after the bananas have been sold.

The present invention contemplates a hook which can be readily and quickly attached under the first branch supporting a cluster of bananas as it extends from the upper part of the stem. This hook is of particular shape and configuration so as to permit the stem to be supported in an upright position and it is also capable of ready attachment and removal.

It is one of the objects of the invention to provide a combination hook and handle so that the bunch of bananas can be readily carried or transported by merely grasping the handle portion of the hook, so as to avoid cutting of the hand.

Another object of the invention is to provide a hook for banana stems which is of a configuration to support the stem in a vertical position in combination with a handle so that the bunch may be carried by grasping the handle of the hook.

Another object of the invention is to provide a combination banana hook and handle where the handle may take either a spherical, coil spring, or cylindrical configuration.

Other and further objects of the invention will be readily apparent when the following description is considered in connection with the accompanying drawing, wherein:

Figure 1 is a side elevation of a banana stem supported by a combination hook and handle where the handle has taken a spherical form.

Figure 2 is a side elevation taken at right angles with regard to the elevation of Figure 1 and showing a coiled spring type of handle.

Figure 3 is a side elevation with the hook in the same position as seen in Figure 1, but illustrating a cylindrical type of handle.

In Figure 1 the stem is illustrated at 2 and the branch 3, which supports the first cluster of bananas, is shown as having been broken away to leave the stub extending from the stem. This branch is usually of sufficient size to act as a support for the entire stem and the weight of bananas. A hook 5 is shown as having been passed underneath the branch so as to support the stem. In Figure 2 this hook 5 is shown as having a peculiar configuration in that the shank 6 is substantially straight and merges at 7 into a curve supporting base portion 8, which in turn terminates in the extended end 9 which is shown as projecting considerably above the branch 3 which it is supporting. This bent or extended end 9 enables the operator to introduce the hook underneath the cluster of bananas and beneath the branch. It will be noted that the angular configuration of the shank 6 with respect to the base 8, is such that the top eye 11 of the hook is substantially vertically over the branch 3 and is arranged so that it will lie along the stem so that the stem will be supported in a vertical position.

The eye 11 of the hook 5 is arranged to be connected to a link 12 which forms the lower portion of the support and handle 13. This link is in the form of an elongated eye, but having the lower end 14 of the wire 15 reversed upon itself so that the extreme end 16 is positioned close to the wire itself as best seen in Figures 1 and 3.

The wire 15 extends vertically above the link and is preferably straight, as seen in Figure 1, for a considerable distance to a point near its upper end where it is bent at 17 to form the finger 18 by which the hook and the bunch of bananas may be suspended from a rope or other support member 19 when the bunch of bananas is to be displayed.

When the bunch of bananas is to be unloaded, instead of attaching the usual string for support, it seems obvious that the hook 5 can be readily and quickly inserted under the branch 3 so as to affix the hook to the bunch of bananas.

A bunch of bananas has considerable weight and in order to enable one to pick up the bunch of bananas and support the weight by means of the hook, a handle 20 has been shown in Figure 1 in the form of a spherical member which may be affixed upon the straight portion 15 of the wire which forms the hook. This ball 20 may be of wood or plastic or any other suitable material, and may be fixed in position, as seen in Figure 1, upon the straight portion of the wire. It may, however, be free to slide on the wire if desired.

Figure 2 shows another modification 20' of the handle wherein the wire 15 has been formed into a coil which may take various configurations, but which will be of sufficient size to be grasped firmly in the hand. This provides some springlike movement and permits the entire support portion of the hook to be made of a single piece of material.

Figure 3 shows another modification of the handle wherein the handle 20" is made up of a cylindrical body 22 of wood or other suitable material which has an opening through its center to receive the wire 15.

The wire has been passed through the handle portion and it has been firmly anchored thereto in any suitable manner. The upper end of the wire is then bent over to form the finger 18. This body portion 22 may be of metal if desired in the form of a metal pipe, the lower end of which may be crimped in after the wire 15 has been inserted therein in a bent-over configuration so that the link 14 is free to swivel or turn relative to the handle. Another piece of wire can be inserted into the upper end and anchored into position to constitute the finger 18.

Broadly, the invention contemplates a banana hook which can be readily applied and removed, and which incorporates a handle portion therein to facilitate the handling of the bunch of bananas, so that the bunch can be lifted with the handle and injury avoided.

What is claimed is:

1. A handle hook for handling and supporting banana bunches including a hook to fit under a cluster branch of the bunch, a handle loosely linked to a said hook comprising a wire bent at one end and connected to said hook, a bend at the other end to support the bunch, and a handle portion on said wire of a size to be gripped by the hand in picking up and handling of the bunch.

2. A handle hook for handling and supporting banana bunches including a hook to fit under a cluster branch of the bunch, a handle loosely linked to said hook comprising a wire bent at one end and connected to said hook, a bend at the other end to support the bunch, and a handle portion on said wire of a size to be gripped by the hand in picking up and handling of the bunch comprising a ball fixed on the wire between the ends thereof.

3. A handle hook for handling and supporting banana bunches including a hook to fit under a cluster branch, a loop on the upper end of the hook, a handle including an elongated cylindrical portion of a size to be gripped in handling and supporting the bunch, a loop extending from the lower end of said handle and connected to the hook loop, and a bent finger extending from the other end of said handle to support the handle, hook and bunch.

MORRIS KAGAN.